US010433302B2

(12) United States Patent
Huang et al.

(10) Patent No.: US 10,433,302 B2
(45) Date of Patent: *Oct. 1, 2019

(54) APPARATUS, COMPUTER READABLE MEDIUM, AND METHOD FOR MULTI-USER REQUEST-TO-SEND AND CLEAR-TO-SEND IN A HIGH EFFICIENCY WIRELESS LOCAL-AREA NETWORK

(71) Applicant: Intel IP Corporation, Santa Clara, CA (US)

(72) Inventors: Po-Kai Huang, San Jose, CA (US); Chittabrata Ghosh, Fremont, CA (US); Robert J. Stacey, Portland, OR (US); Qinghua Li, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/868,016

(22) Filed: Jan. 11, 2018

(65) Prior Publication Data

US 2018/0206233 A1    Jul. 19, 2018

Related U.S. Application Data

(63) Continuation of application No. 14/861,501, filed on Sep. 22, 2015, now Pat. No. 9,894,653.

(Continued)

(51) Int. Cl.
*H04W 72/04*   (2009.01)
*H04L 12/741*   (2013.01)
(Continued)

(52) U.S. Cl.
CPC ....... *H04W 72/0446* (2013.01); *H04L 5/0037* (2013.01); *H04L 5/0094* (2013.01);
(Continued)

(58) Field of Classification Search
CPC ..................................................... H04L 5/0037
(Continued)

(56) References Cited

U.S. PATENT DOCUMENTS 8,837,478 B1    9/2014 Nemavat
9,894,653 B2 *  2/2018 Huang .............. H04W 72/0446
(Continued)

FOREIGN PATENT DOCUMENTS

CN          107409035 A    11/2017
WO    WO-2011099729 A2     8/2011
(Continued)

OTHER PUBLICATIONS

"European Application Serial No. 16783538.8, Extended European Search Report dated Oct. 24, 2018", 9 pgs.

(Continued)

*Primary Examiner* — Peter G Solinsky
(74) *Attorney, Agent, or Firm* — Schwegman Lundberg & Woessner, P.A.

(57) ABSTRACT

Methods, apparatuses, and computer readable media for MU-RTS and CTS in WLANs are disclosed. An apparatus is disclosed that comprises circuitry that is configured to generate a packet to indicate a multi-user request-to-send (MU-RTS), wherein the packet indicates one or more HEW station information fields, wherein the one or more HEW station information fields comprise an address of a HEW station and an indication of a bandwidth for the HEW station to transmit one or more clear-to-send (CTS) packets; and transmit the packet to the one or more HEW stations. A HEW device is disclosed that includes circuitry configured to receive a multi-user request-to-send (MU-RTS); copy a scramble seed from the MU-RTS to a clear-to-send (CTS) packet; and transmit the CTS packet.

25 Claims, 10 Drawing Sheets

Related U.S. Application Data

(60) Provisional application No. 62/152,093, filed on Apr. 24, 2015.

(51) Int. Cl.
*H04L 5/00* (2006.01)
*H04W 74/08* (2009.01)
*H04W 74/00* (2009.01)

(52) U.S. Cl.
CPC ......... *H04L 45/74* (2013.01); *H04W 74/0816* (2013.01); *H04L 5/006* (2013.01); *H04W 74/006* (2013.01)

(58) Field of Classification Search
USPC ........................................................ 370/329
See application file for complete search history.

(56) References Cited

U.S. PATENT DOCUMENTS

| | | | |
|---|---|---|---|
| 2010/0080173 A1 | 4/2010 | Takagi | |
| 2010/0309871 A1 | 12/2010 | Fischer et al. | |
| 2010/0316150 A1 | 12/2010 | Amini et al. | |
| 2011/0002319 A1 | 1/2011 | Husen et al. | |
| 2011/0090855 A1 | 4/2011 | Kim | |
| 2011/0149918 A1 | 6/2011 | Gong et al. | |
| 2011/0150004 A1 | 6/2011 | Denteneer et al. | |
| 2011/0194644 A1 | 8/2011 | Liu et al. | |
| 2011/0317630 A1 | 12/2011 | Zhu et al. | |
| 2012/0087358 A1 | 4/2012 | Zhu et al. | |
| 2012/0134324 A1 | 5/2012 | Chu et al. | |
| 2012/0147804 A1* | 6/2012 | Hedayat | H04W 74/0816 370/312 |
| 2013/0229996 A1 | 9/2013 | Wang et al. | |
| 2014/0050173 A1 | 2/2014 | Yang | |
| 2015/0063190 A1 | 3/2015 | Merlin et al. | |
| 2016/0100408 A1 | 4/2016 | Hedayat | |
| 2016/0113009 A1 | 4/2016 | Seok | |
| 2016/0113034 A1 | 4/2016 | Seok | |
| 2016/0128102 A1 | 5/2016 | Jauh | |
| 2016/0302185 A1 | 10/2016 | Sun et al. | |
| 2016/0316468 A1 | 10/2016 | Huang et al. | |
| 2016/0353275 A1 | 12/2016 | Liu et al. | |
| 2016/0360528 A1 | 12/2016 | Kim et al. | |
| 2017/0013645 A1 | 1/2017 | Choi et al. | |

FOREIGN PATENT DOCUMENTS

| | | |
|---|---|---|
| WO | WO-2013025820 A2 | 2/2013 |
| WO | WO-2016171795 A1 | 10/2016 |

OTHER PUBLICATIONS

"European Application Serial No. 16783538.8, Response filed Jun. 11, 2018 to Communication pursuant to Rules 161(2) and 162 EPC dated Dec. 1, 2017", 8 pgs.

"U.S. Appl. No. 14/861,501, Examiner Interview Summary dated Jun. 27, 2017", 3 pgs.

"U.S. Appl. No. 14/861,501, Non Final Office Action dated Mar. 17, 2017", 19 pgs.

"U.S. Appl. No. 14/861,501, Notice of Allowance dated Oct. 6, 2017", 9 pgs.

"U.S. Appl. No. 14/861,501, Response filed Jun. 19, 2017 to Non Final Office Action dated Mar. 17, 2017", 9 pgs.

"International Application Serial No. PCT/US2016/020332, International Preliminary Report on Patentability dated Nov. 2, 2017", 10 pgs.

"International Application Serial No. PCT/US2016/020332, International Search Report dated Jul. 27, 2016", 5 pgs.

"International Application Serial No. PCT/US2016/020332, Written Opinion dated Jul. 27, 2016", 8 pgs.

"European Application Serial No. 16783538.8, Response filed May 2, 2019 to Extended European Search Report dated Oct. 24, 2018", 14 pgs.

* cited by examiner

APPARATUS, COMPUTER READABLE MEDIUM, AND METHOD FOR MULTI-USER REQUEST-TO-SEND AND CLEAR-TO-SEND IN A HIGH EFFICIENCY WIRELESS LOCAL-AREA NETWORK

PRIORITY CLAIM

This application is a continuation of U.S. patent application Ser. No. 14/861,501, filed Sep. 22, 2015, which claims the benefit of priority under 35 USC 119(e) to U.S. Provisional Patent Application Ser. No. 62/152,093, filed Apr. 24, 2015, each of which is incorporated herein by reference in its entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to multi-user request-to-send (MU-RTS) and clear-to-send (CTS). Some embodiments relate to MU-RTS and CTS as part of a trigger frame.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Moreover, wireless devices may need to operate with both newer protocols and with legacy device protocols.

Thus, there are general needs for improved methods, apparatuses, and computer readable media for MU-RTS and CTS in WLANs.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
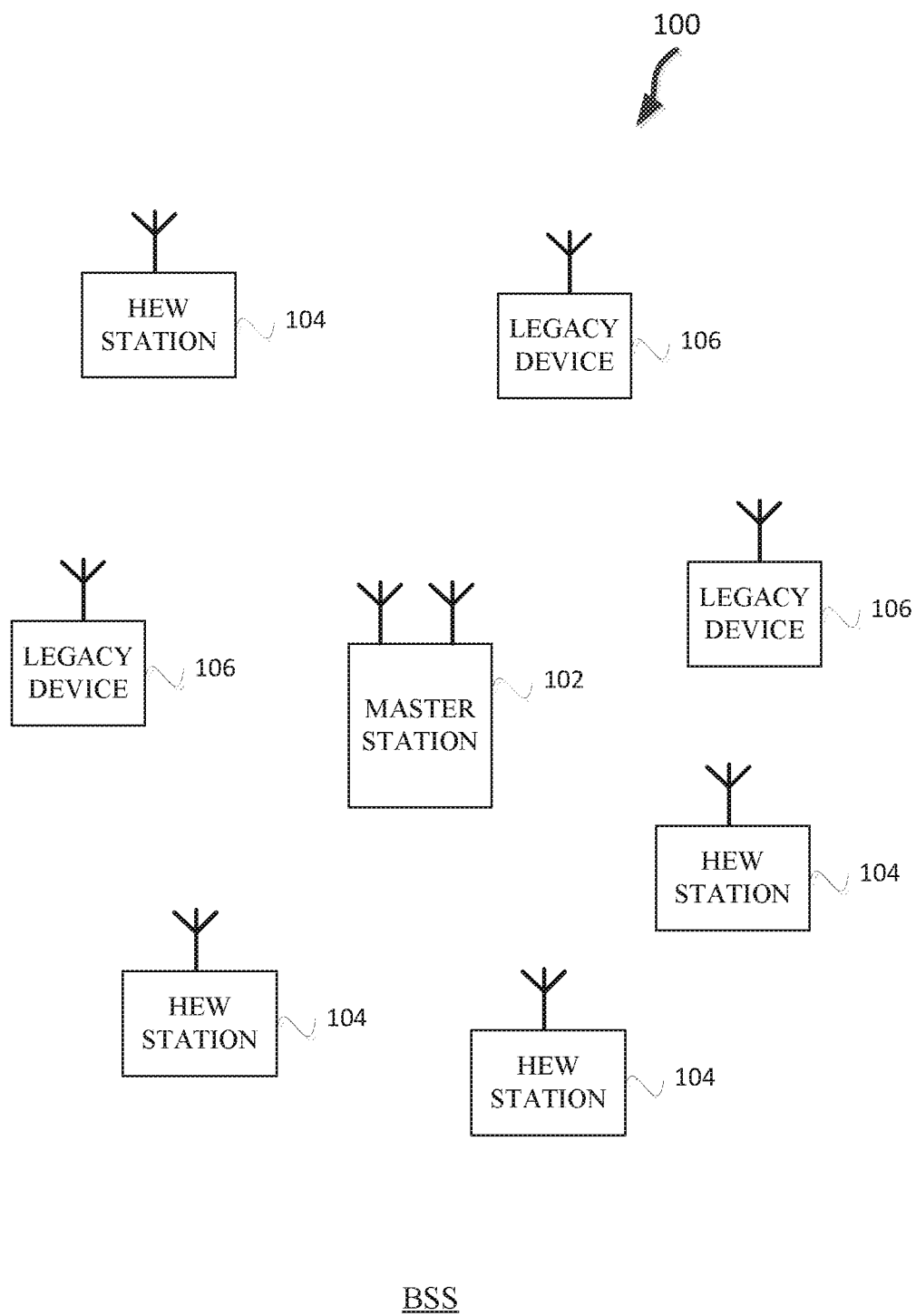
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include a master station 102, which may be an access point (AP), a plurality of high-efficiency wireless (HEW) (e.g., IEEE 802.11ax) stations 104 and a plurality of legacy (e.g., IEEE 802.11n/ac) devices 106.

The master station 102 may be an access point (AP) using the 802.11 to transmit and receive. The master station 102 may be a base station. The master station 102 may be a master station. The master station 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW devices 104 may operate in accordance with 802.11ax or another standard of 802.11. The legacy devices 106 may operate in accordance with one or more of 802.11 a/g/ag/n/ac, or another legacy wireless communication standard. The HEW devices 104 may be high efficiency (HE) stations. The legacy devices 106 may be stations.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the master station 102 may communicate with one or more of the HEW devices 104 on one or more of the secondary channels or sub-channels or the primary channel. In example embodiments, the master station 102 communicates with the legacy devices 106 on the primary channel. In example embodiments, the master station 102 may be configured to communicate concurrently with one or more of the HEW devices 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a subchannel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.5 MHz, 5 MHz and 10 MHz, or a combination thereof or another bandwidth that is less or equal to the available bandwidth, may also be used. A HEW frame may be configured for transmitting a number of spatial streams.

In other embodiments, the master station 102, HEW device 104, and/or legacy device 106 may also implement different technologies such as CDMA2000, CDMA2000 1×, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, if the master station 102 transmits a beacon only on a primary channel, then the HEW devices 104 and legacy devices 106 need to receive the beacon on the primary channel every multiple of a beacon interval (it could be every beacon interval or every 10th beacon or etc) to maintain their synchronization with the system (e.g. master station 102).

In an OFDMA system (e.g. 802.11ax), an associated HEW device 104 may operate on a subchannel, which may be 20 MHz, of the BSS 100 (that can operate, for example, at 80 MHz). The HEW device 104 may enter a power save mode, and upon coming out of power save mode, the HEW device 104 may need to re-synchronize with BSS 100 by receiving a beacon. If a beacon is transmitted only on the primary channel, then HEW device 104 needs to move and tune to the primary channel upon waking up to be able to receive beacons. Then the HEW device 104 needs to re-tune back to its operating subchannels, which may be 20 MHz, or it has to follow a handshake procedure to let master station 102 know of a new operating subchannel. The HEW device 104 may risk losing some frames during the channel switch, in example embodiments.

In example embodiments, the HEW device 104 and/or the master station 102 are configured to perform the methods and functions herein described in conjunction with FIGS. 1-13 and disclosed herein such as generating trigger frames that indicate a MU-RTS period, MU-RTSs, and CTSs; transmitting MU-RTS, CTSs, and trigger frames; receiving trigger frames, MU-RTSs, and CTSs; and, operating in accordance with the received trigger frames, MU-RTSs and/or CTSs.

Figure 2:
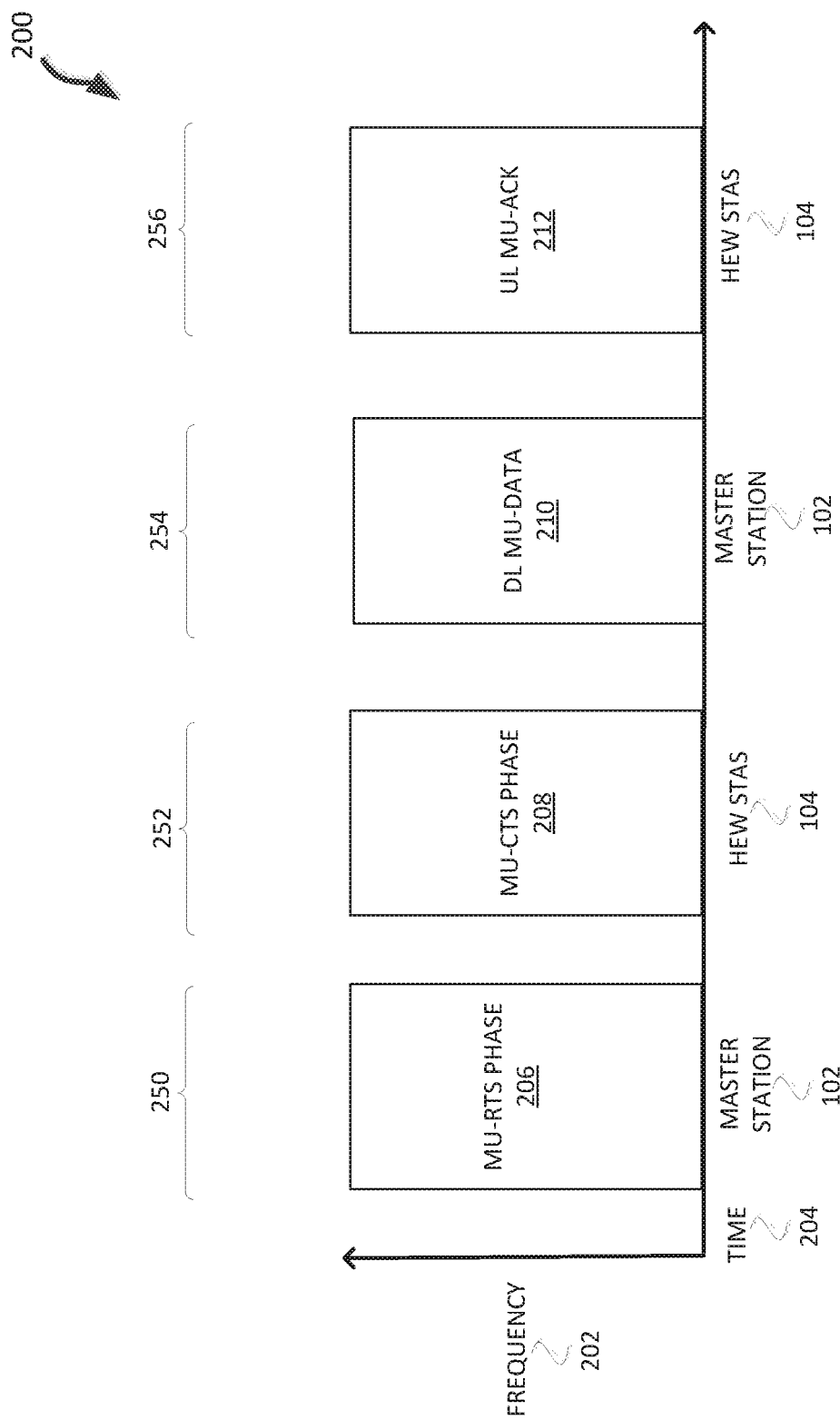
FIG. 2 illustrates a method of MU-RTS and MU-CTS in accordance with some embodiments.

FIG. 2 illustrates a method 200 of MU-RTS and MU-CTS in accordance with some embodiments. Illustrated in FIG. 2 is time 204 along a horizontal axis and frequency 202 along a vertical axis. The method 200 may begin at operation 250 with the master station 102 transmitting in a MU-RTS phase 206. The master station 102 may transmit to one or more HEW STAs 104 an indication of a request to transmit a CTS packet. The method 200 may continue at operation 252 with the HEW STAs 104 transmitting in a MU-CTS phase 208. The MU-CTS phase 208 comprises one or more HEW STAs 104 transmitting a MU-CTS. The method 200 may continue at operation 254 with downlink (DL) MU-DATA 210 being transmitted by the master station 102 to one or more HEW STAs 104. The one or more HEW STAs 104 that receive DL MU-DATA 210 may be a different set of HEW STAs 104 than the HEW STAs 104 that transmitted MU-CTSs in the MU-CTS phase 208. The one or more HEW STAs 104 that receive DL MU-DATA 210 may be a different set of HEW STAs 104 than the HEW STAs 104 that were addressed in the MU-RTS phase 206 transmitted by the master station 102.

The method 200 may continue at operation 256 with the one or more HEW STAs transmitting uplink multi-user acknowledgements (UL MU-ACKs) 212 to the master station 102. The method 200 may end. In some embodiments one or more operations may be repeated.

Figure 3:
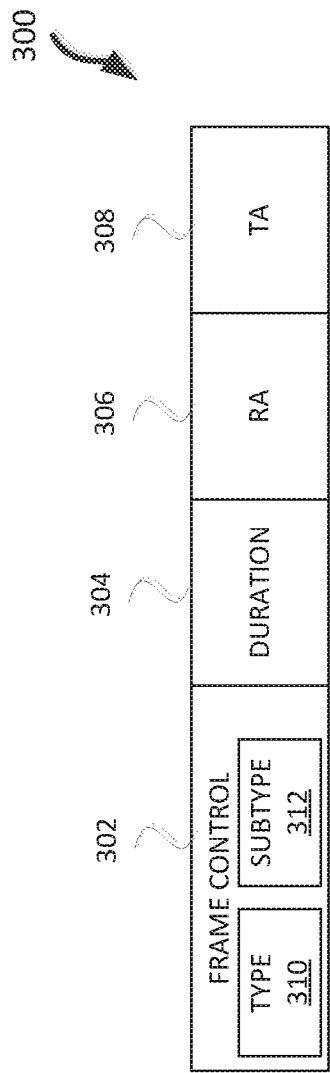
FIG. 3 illustrates a MU-RTS frame in accordance with some embodiments.

FIG. 3 illustrates a MU-RTS 300 frame in accordance with some embodiments. The MU-RTS 300 may include a frame control 302, duration 304, receiver address (RA) 306, and transmitter address (TA) 308. The MU-RTS 300 may be a new media access control (MAC) frame. The frame control 302 may include a type 310 and a subtype 312. Portion of the MU-RTS 300 frame may indicate that the MU-RTS 300 frame is a MU-RTS 300 frame. In some embodiments the type 310 may indicate a control frame and the subtype 312 may use an unused reserved control frame subtype to indicate the MU-RTS 300 frame. For example, in some embodiments the type 310 may indicate a control frame and the subtype 312 may be one of 0000, 0001, 0010, and 0011 to indicate the MU-RTS 300 frame.

In some embodiments the type 310 may indicate a control frame and subtype 312 may indicate a subtype 312 extension with the control frame extension (not illustrated) indicating the MU-RTS 300 frame. For example, the subtype 312 value may be 0110 to indicate a control frame extension, and the control frame extension value may be one of 0000, 0001, or 1011-1111 to indicate the MU-RTS 300 frame.

In some embodiments the type 310 may indicate a type extension with a value of, e.g. 11, and the subtype may one of 0001-1111 to indicate that the frame is the MU-RTS 300 frame.

The RA 306 field may be a broadcast address. The RA 306 field being a broadcast address may indicate to the HEW stations 104 that the MU-RTS 300 frame is a broadcast frame to all of the HEW stations 104.

The MU-RTS phase 206, MU-CTS phase 208, DL MU-DATA 210, and UL MU-ACK 212 may be transmitted with a bandwidth of 20, 40, 80, 160, or 320 MHz. In some embodiments a portion of one of MU-RTS phase 206, MU-CTS phase 208, DL MU-DATA 210, and UL MU-ACK 212 may be transmitted with a different bandwidth, e.g. in the MU-CTS phase a HEW STA 104 may transmit a response to the master station 102 that has a bandwidth of 1 MHz, 2.5 MHz, 5 MHz, or 10 MHz.

Figure 4:
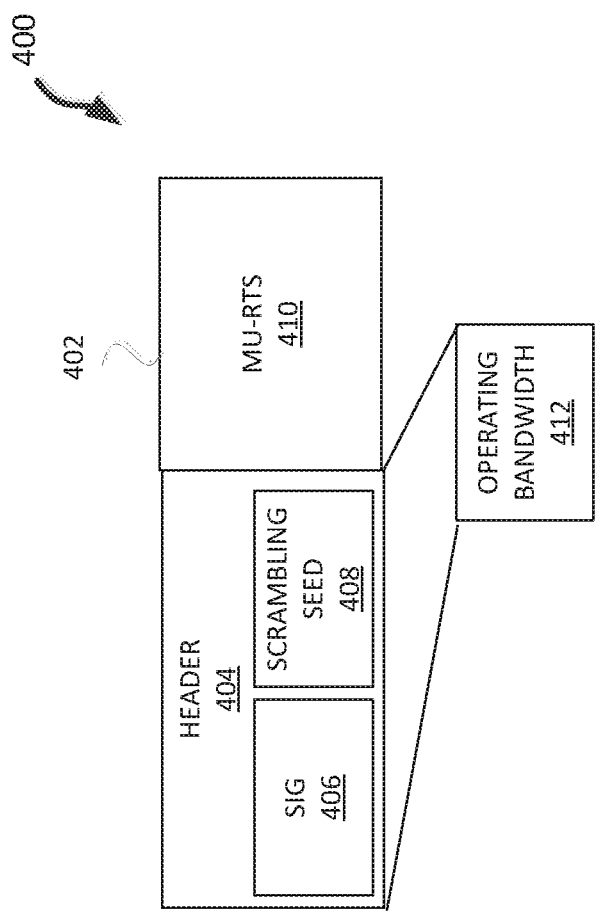
FIG. 4 illustrates a physical (PHY) frame that encapsulates a MU-RTS 410 frame in accordance with some embodiments.

FIG. 4 illustrates a physical (PHY) 402 frame that encapsulates a MU-RTS 410 frame in accordance with some embodiments. The PHY 402 frame may include a header 404 that may include signal (SIG) 406 field and a scrambling seed 408. The SIG 406 field may include one or more SIG fields. The scrambling seed 408 may be a seed used by a convolution encoder for transmitting the PHY 402 frame.

In some embodiments the PHY 402 frame may indicate an operating bandwidth 412. The operating bandwidth 412 may indicate an operating bandwidth for the MU-RTS and/or MU-CTS. In some embodiments an operating bandwidth 412 may be indicated by the scramble seed 408. For example, if the IEEE 802.11a communication protocol is being used, then an operating bandwidth 412 may be indicated by the scrambling seed 408. The operating bandwidth 412 may be indicted in the same way using the scrambling seed 408 as is currently indicated in legacy communication protocols for single user (SU) RTS. In some embodiments a portion of the SIG 406 field such as a SIG-A field (not illustrated) may indicate the operating bandwidth 412.

Figure 5:
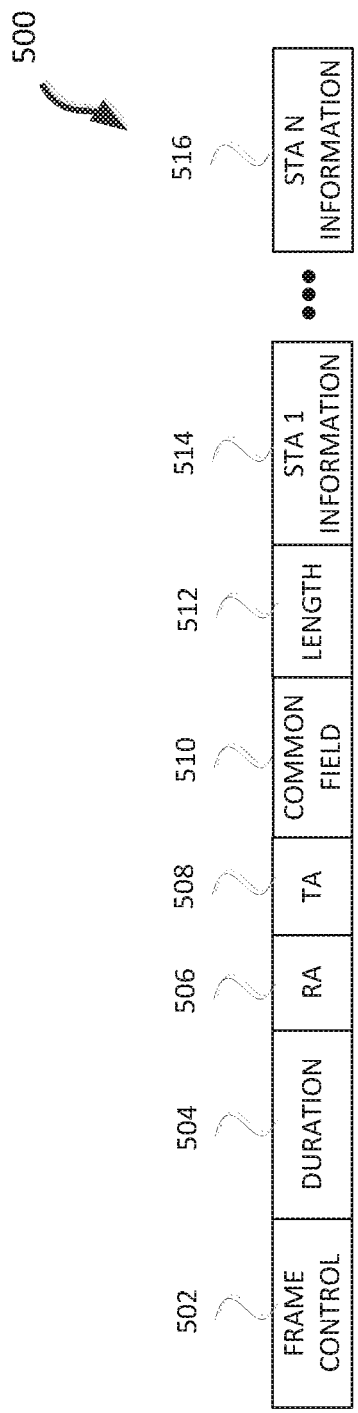
FIG. 5 illustrates a MU-RTS that may include a variable number of station information fields in accordance with some embodiments.

FIG. 5 illustrates a MU-RTS 500 that may include a variable number of station information fields in accordance with some embodiments. The MU-RTS 500 may include frame control 502, duration 504, RA 506, TA 508, common field 510, length 512, STA 1 information 514, and STA N information 516 where there may be station information for N stations. The STAs may be HEW stations 104. The number N may be variable. The duration 504 may indicate a duration of the MU-RTS 500.

The length 512 field may indicate information to determine the size of the MU-RTS 500 frame. For example the length 512 field may indicate the number N of station information fields in the MU-RTS 500. The common field 510 may include information that may be common for the STAs indicated in the STA information fields. For example, the common field 510 may include a PHY format for the STAs to use to respond to the MU-RTS 500 frame, a BSS identification, a MAC format for the STAs to use to respond to the MU-RTS 500 frame, a network allocation vector (NAV) checking rule, and/or a medium checking rule such as clear channel assessment parameters.

Figure 6:
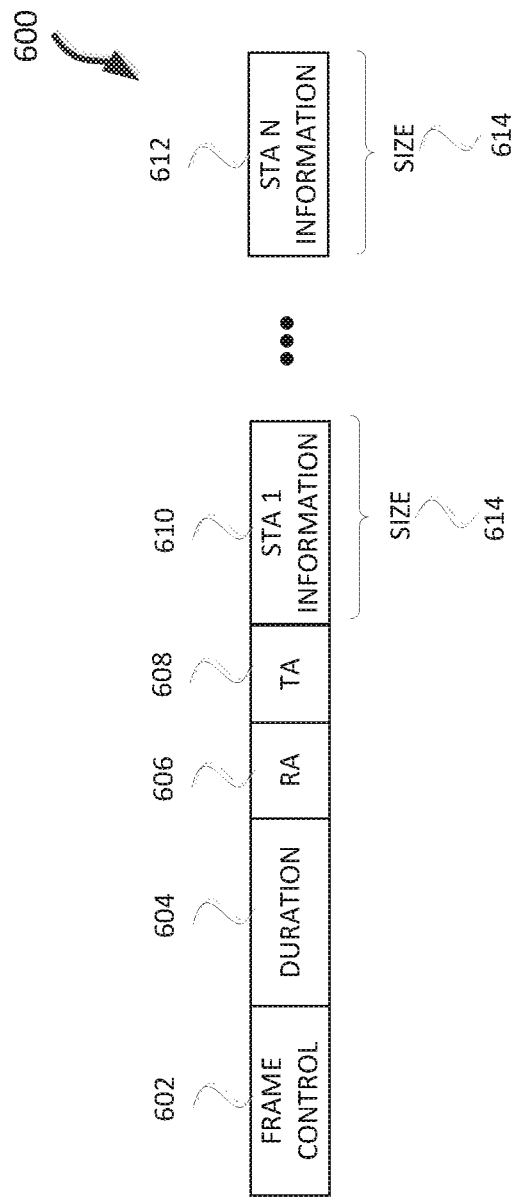
FIG. 6 illustrates a MU-RTS that may include a fixed number of station information fields in accordance with some embodiments.

FIG. 6 illustrates a MU-RTS 600 that may include a fixed number of station information fields in accordance with some embodiments. Illustrated in FIG. 6 is a frame control 602, duration 604, RA 606, TA 608, STA 1 information 610, STA N information, where the number N may be fixed. The STA 1 information through STA N information fields may have a size 614. The size 614 may be a fixed size in accordance with some embodiments.

Figure 7:
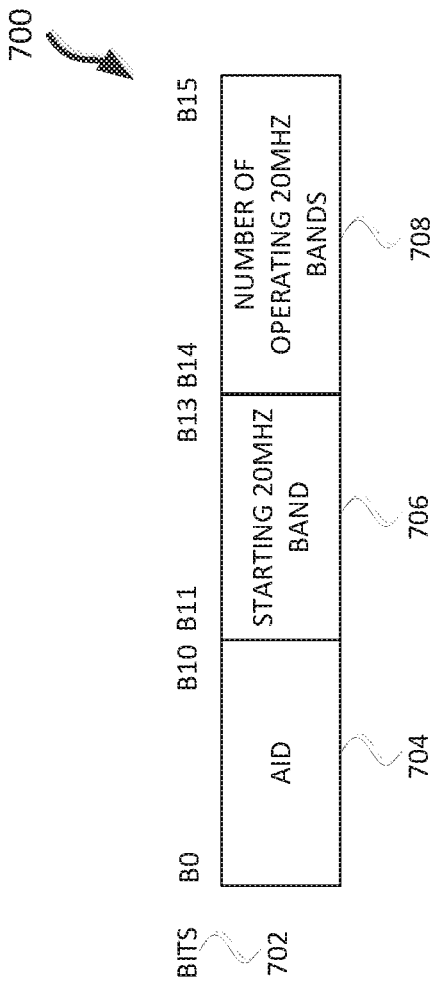
FIG. 7 illustrates a station information field in accordance with some embodiments.

FIG. 7 illustrates a station information 700 field in accordance with some embodiments. The station information 700 field may include an AID 704, starting 20 MHz band 706, and number of operating 20 MHz Bands 708. The station information 700 may be the station information 515 and/or station information 610 as described in conjunction with FIGS. 5 and 6.

The AID 704 may be an address of a HEW station 104. For example, the AID 704 may be the association identification (AID) of the HEW station 104. Other identifiers may be used to identify the HEW station 104. The starting 20 MHz band 706 and number of operating 20 MHz bands 708 may indicate one or more 20 MHz bands for the HEW sta 104 with AID 704 to respond on for the CTS. The CTS may have a granularity of 20 MHz. In some embodiments the granularity may be different than 20 MHz, although 20 MHz is used as an example in the disclosure. In some embodiments the granularity may be variable and may be indicated by the master station 102 to the HEW stations 104.

The starting 20 MHz band 706 may be an indication of a position of a first 20 MHz band, and number of operating 20 MHz bands 708 indicating a number of 20 MHz bands. For example, starting 20 MHz band 706 may be 1, 2, through a number of 20 MHz bands, and number of operating 20 MHz bands 708 may be a number that indicates up to a maximum number of 20 MHz bands that may be signaled for the CTS response. For example, starting 20 MHz band 706 may be 2 and number of operating 20 MHz bands 708 may be 3 indicating that the 2nd 20 MHz is the first band for the CTS response and the next two contiguous 20 MHz bands are also for the CTS response. The CTS response may be a bandwidth of the entire contiguous bandwidth indicated or may be repeated on each 20 MHz bandwidth.

In some embodiments the starting 20 MHz band 706 and number of operating 20 MHz bands 708 may indicate to the HEW station 104 the subchannels the master station 102 will use for DL data to the HEW station, e.g. as disclosed in FIG. 2 operation 210. A station may be signaled with the station information 700 field and may not receive data in the DL data operation 210. A station may not be signaled with the station information 700 field and may receive data in the DL data operation 210.

In some embodiments the station information 700 field may be a variable size with each of the station information 700 fields being the same size. The size of the station information 700 field may be indicated by the master station 102.

The bits 702 may indicate bits that may be used for the AID 704, starting 20 MHz band 706, and number of operating 20 MHz bands 708 fields. For example as illustrated the AID 704 is bit 0 through bit 10, the starting 20 MHz band 706 is bit 11 through b 13, and number of operating 20 MHz bands 706 is bits 14 through bit 15. A different number of bits may be used for the fields.

Figure 8:
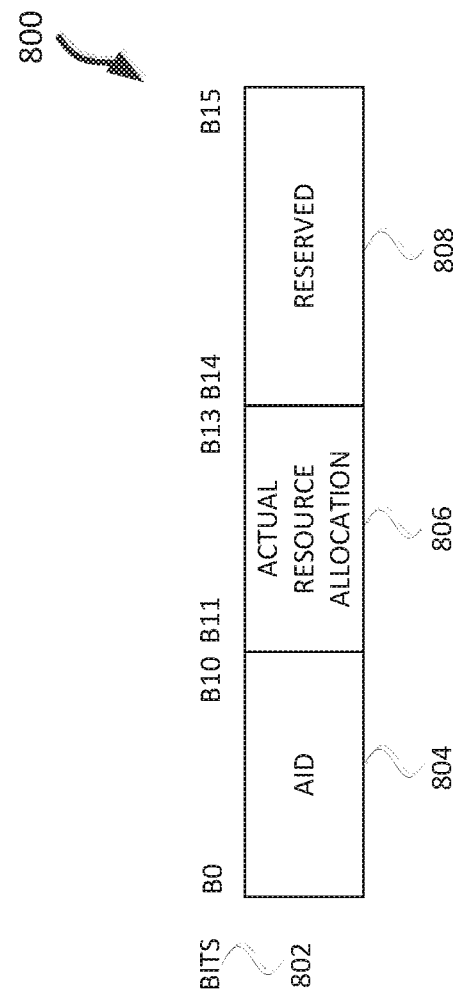
FIG. 8 illustrates a station information field in accordance with some embodiments.

FIG. 8 illustrates a station information 800 field in accordance with some embodiments. The station information 800 field may include an AID 804, actual resource allocation 806, and reserved 808. The station information 800 may be the station information 515 and/or station information 610 as described in conjunction with FIGS. 5 and 6. In some embodiments the station information 800 field may not include the reserved 808 field.

The AID 804 may be similar or the same as the AID 704 as described in conjunction with FIG. 7. The actual resource allocation 806 may indicate a size of a resource allocation for the HEW STA 104 to transmit a CTS. For example, the actual resource allocation 806 may be number from 1 to the maximum number of 20 MHz bands in use by the master station 102. The HEW STA 104 indicated by the AID 804 may determine the resource allocation 806 based on previous resource allocations 806. For example, the starting position of the actual resource allocation 806 may be determined based on the actual resource allocations 806 of previous station information 800 fields. For example, if a HEW station 104 is a second station in the station information 514 or station information 610, then the HEW station 104 determines that the resource allocation 806 starts after the first station. Continuing with the example, if the actual resource allocation 806 of STA 1 was 2 and the actual resource allocation 806 of STA 2 was 3, then the resource allocation of STA 2 would be the 3rd, 4th, and 5th 20 MHz bands. The CTS response may be a bandwidth of the entire contiguous bandwidth indicated or may be repeated on each 20 MHz bandwidth.

The bits 802 may indicate bits that may be used for the AID 804, actual resource allocation 806, and reserved 808 fields. For example as illustrated the AID 804 is bit 0 through bit 10, the actual resource allocation is bit 11 through bit 13, and reserved is bit 14 through bit 15. A different number of bits may be used for the fields.

In some embodiments the actual resource allocation 806 may indicate to the HEW station 104 the sub-channels the master station 102 will use for DL data to the HEW station, e.g. as disclosed in FIG. 2 operation 210. A station may be signaled with the station information 800 field and may not receive data in the DL data operation 210. A station may not be signaled with the station information 800 field and may receive data in the DL data operation 210.

In some embodiments the station information 800 field may be a variable size with each of the station information 800 fields being the same size. The size of the station information 800 field may be indicated by the master station 102.

The reserved 808 field may include one or more of the following: whether the STA is to respond with a CTS, whether power control is to be used, the size of station information, the format of station information, spatial reuse operation, CTS response under conditions such as low signal to noise ratio (SNR), a bit to indicate if other HEW stations that receive the packet are permitted to perform spatial reuse, and/or signal to interference plus noise ratio (SINR).

Figure 9:
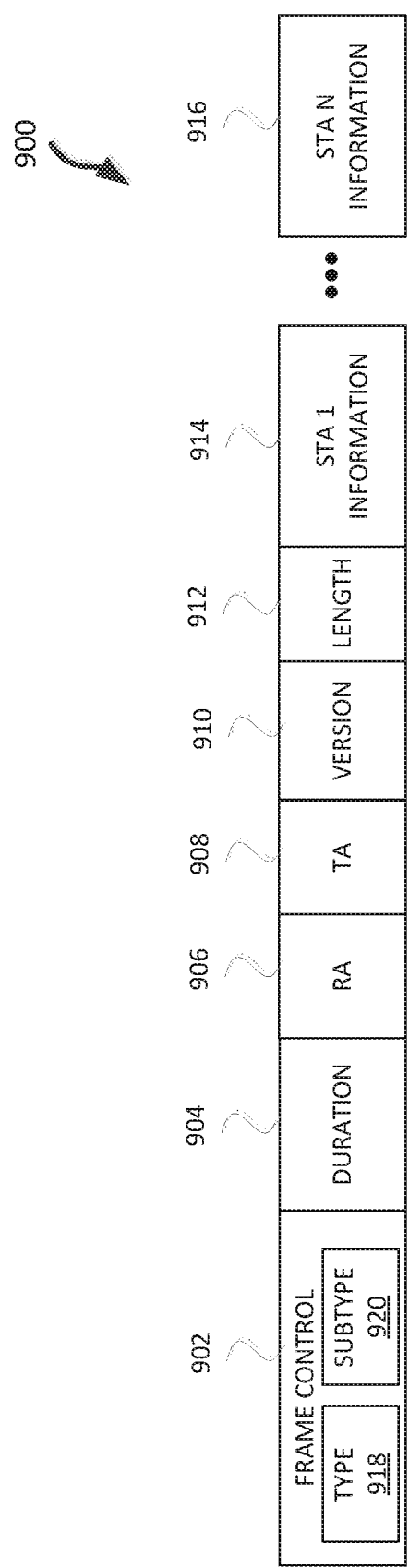
FIG. 9 illustrates a MAC trigger frame that may indicate a MU-RTS in accordance with some embodiments.

FIG. 9 illustrates a MAC trigger frame 900 that may indicate a MU-RTS in accordance with some embodiments. The MAC trigger frame 900 may include a frame control 902, duration 904, RA 906, TA 908, version 910, length 912, STA 1 information 914, through STA N information, in accordance with some embodiments.

The version 910 field may indicate whether the trigger frame 900 is indicating a MU-RTS. The trigger frame 900 may indicate whether the trigger frame 900 is indicating a MU-RTS in other ways. For example, the type 918 and/or subtype 920 fields may be used to indicate that the MAC trigger frame 900 is both a trigger frame and whether or not a MU-RTS is indicated. For example, if a trigger frame is indicated by a type 918 of 11 or a new control type, the version 910 field can indicated in B11 to B8 of frame control 902 field. The length 912, STA 1 information 914, and STA N information 916 fields may be similar or the same as disclosed in conjunction with FIG. 5. In some embodiments, the STA 1 information 914, and STA N information 916 fields may not be replaced with fields similar to or the same as the STA 1 information 610 and STA N information 612 fields as disclosed in conjunction with FIG. 6.

Figure 10:
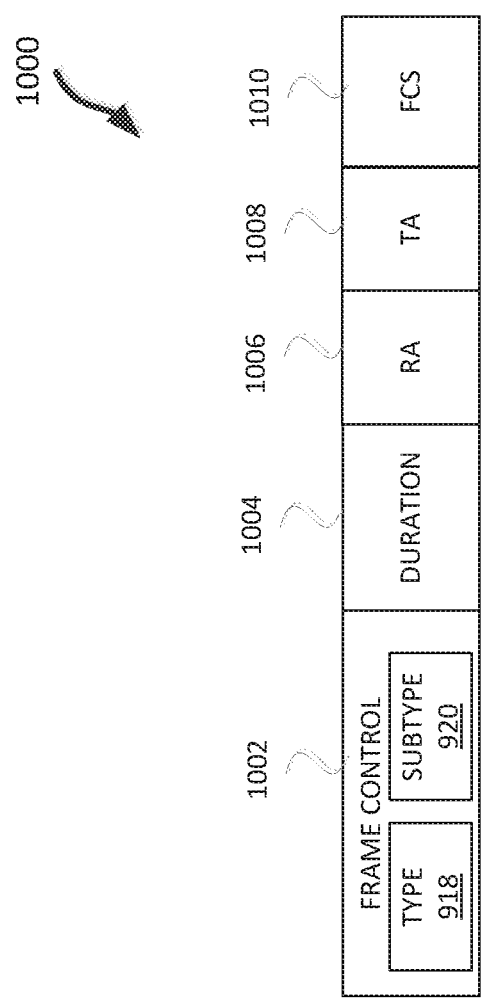
FIG. 10 illustrates a MU-RTS in accordance with some embodiments.

FIG. 10 illustrates a MU-RTS 1000 in accordance with some embodiments. The MU-RTS 1000 may have the same or similar format as a legacy single user (SU-RTS). The MU-RTS 1000 may include a frame control 1002, duration 1004, RA 1006, TA 1008, and FCS 1010. The frame control 1002 may include a type 918 and subtype 920. The MU-RTS 1000 may include an indication that the MU-RTS 1000 is the MU-RTS 1000 and not the SU-RTS. For example, the RA 1006 field may be set to the BSSID, or one or more of B11, B10, B9, and B8 may be used to indicate that the MU-RTS 1000 is a MU-RTS 1000 and not a SU-RTS. The duration 1004 may be determined to extend to the end of a transmission opportunity.

Figure 11:
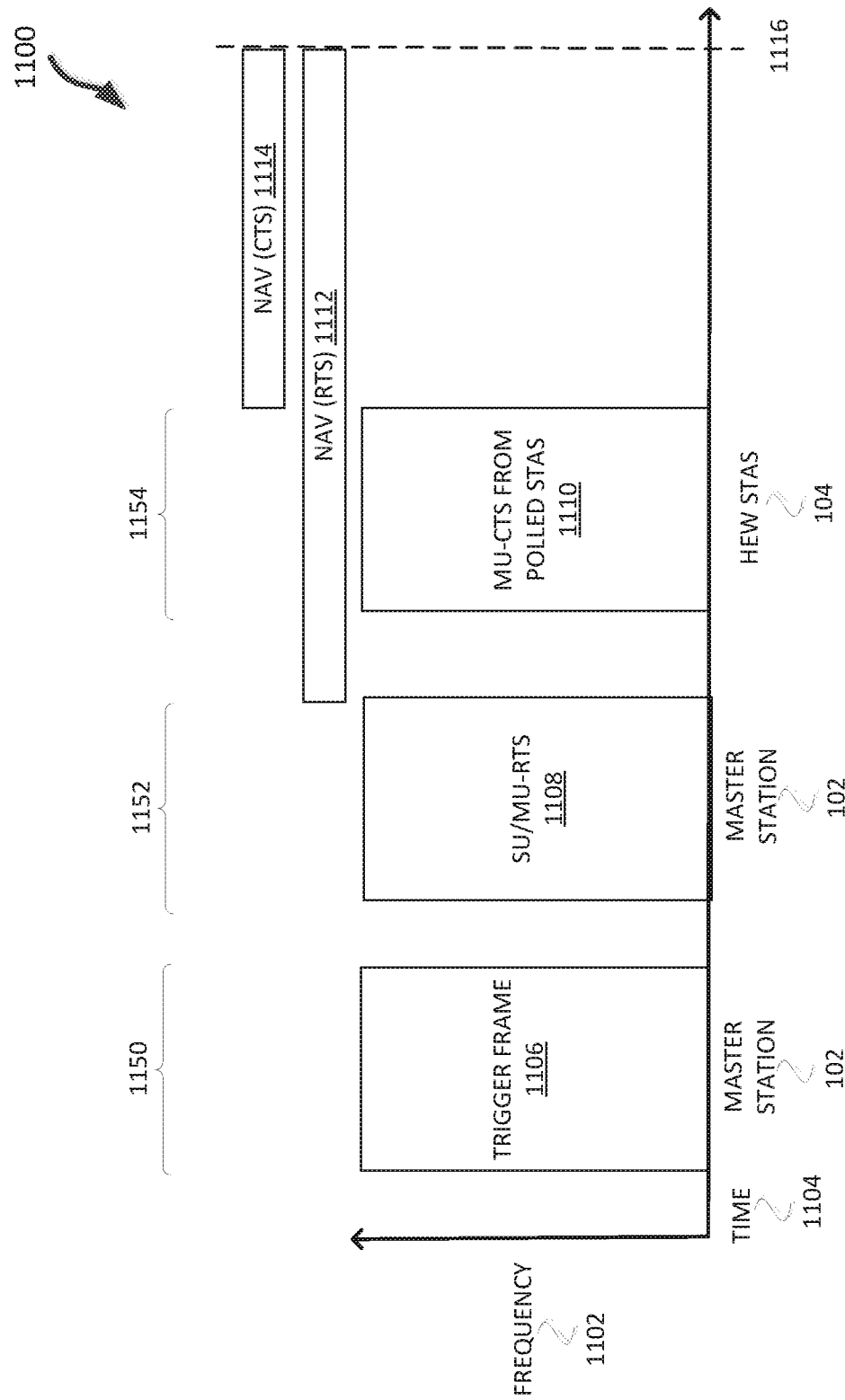
FIG. 11 illustrates a method for signaling a MU-RTS in accordance with some embodiments.

FIG. 11 illustrates a method 1100 for signaling a MU-RTS in accordance with some embodiments. Illustrated in FIG. 11 is time 1104 along a horizontal axis and frequency 1102 along a vertical axis. The method 1110 may begin at operation 1150 with a trigger frame 1106 being transmitted by a master station 102. The trigger frame 1106 may be the same or similar to the trigger frame 900 of FIG. 9 or may be in another format. The trigger frame 1106 may include resource allocations for one or more HEW STAs 104. The trigger frame 1106 may be transmitted on a bandwidth that may be a multiple of 20 MHz. The method 1100 may continue at operation 1152 with the master station 102 transmitting a SU/MU-RTS 1108. The SU/MU-RTS 1108 may have a similar or same format as the MU-RTS 1000 described in conjunction with FIG. 10. For example, the SU/MU-RTS 1108 may have a same format as a SU-RTS with an indication that the SU-RTS is a MU-RTS. The SU/MU-RTS 1108 may set a NAV 1112 that extends to time 1116, which may be a time when transmission opportunity signaled by the trigger frame 1106 may end. For example, time 1116 may correspond to the end of UL MU-ACK 212 as disclosed in conjunction with FIG. 2.

The method 1100 may continue at operation 1154 with the HEW STAs transmitting MU-CTS from polled STAs 1110. The HEW STAs 104 may include a NAAV 1114 in the MU-CTSs from polled STAs 1110 that extends to time 1116.

The HEW STAs 104 may be configured to determine a SU-RTS is a MU-RTS if it is received after the trigger frame 1106 and before the end of the transmission opportunity and if the SU-RTS is received from the same master station 102.

If a HEW STA 104 receives the trigger frame 1106 with version equal to MU-RTS and SU-RTS indicated as specialized RTS after the trigger, then HEW STA 104 may respond with a CTS. If a HEW STA 104 does not receive the trigger frame 1106 with version equal to MU-RTS but receives SU-RTS indicated as specialized RTS, then HEW STA 104 does not respond with CTS. If a HEW STA 104 receives trigger frame 1106 with version equal to MU-RTS but does not receive SU-RTS indicated as specialized RTS after trigger, then HEW STA 104 does not respond with CTS. A technical effect of the method 1100 is that SU-RTS may be reused so that a NAV cancellation can be used for legacy devices 106 after the SU-RTS is sent.

Figure 12:
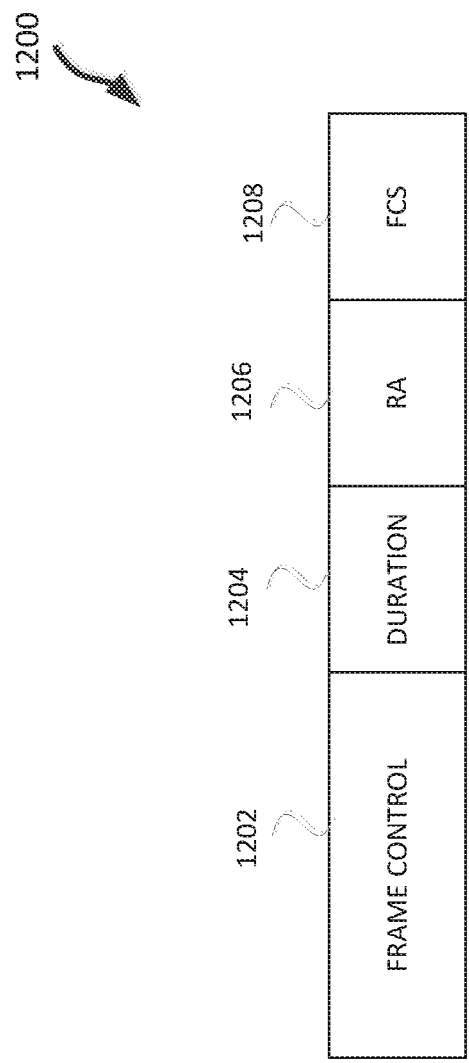
FIG. 12 illustrates a MU-CTS in accordance with some embodiments.

FIG. 12 illustrates a MU-CTS 1200 in accordance with some embodiments. The MU-CTS 1200 may include a frame control 1202, duration 1204, RA 1206, and FCS 1208. The frame control 1202 may have a frame subtype of 1100 to indicate the frame is a CTS frame. The duration 1204 may be based on the duration of a MU-RTS and determined to extend to an end of a transmission opportunity. The RA 1206 may be the transmitter of the MU-RTS. The frame control sequence (FCS) 1010 may be a frame control sequence in accordance with one or more communication standards such as IEEE 802.11. In some embodiments the CTS 1200 frame has a same PHY format as a received MU-RTS. In some embodiments the CTS 1200 has a PHY format that is indicated by a received MU-RTS. In some embodiments the CTS 1200 has a PHY format in accordance with IEEE 802.11a, i.e. a non-high throughput (HT) PHY convergence procedure (PLCP) protocol data unit (PPDU). The MU-CTS 120 may have a same MAC format as a legacy CTS format. In some embodiments HEW STAs 104 are configured to use a MAC format for the MU-CTS 1200 that is indicated by MU-RTS.

The MU-CTS 1200 may be transmitted with a 20 MHz granularity. The MU-CTS 1200 may copy the scramble seed (not illustrated) from the MU-RTS.

The MU-CTS 1200 may use a same rate as a MU-RTS or follow a rate selection rule. The rate selection rule may be in accordance with IEEE 802.11ax, which is a rule to determine a common rate among all polled STAs. In some embodiments, the HEW STAs 104 may select the primary rate under a rate selection rule in accordance with IEEE 802.11ax.

Figure 13:
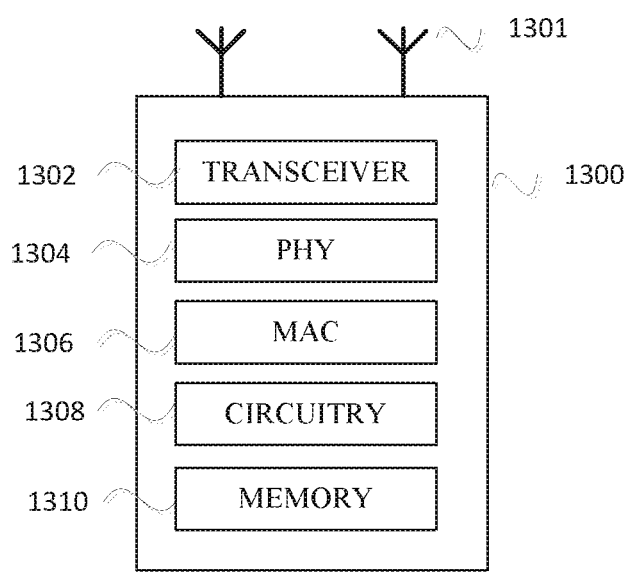
FIG. 13 illustrates a HEW station in accordance with some embodiments.

FIG. 13 illustrates a HEW device 1300 in accordance with some embodiments. HEW device 1300 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 1300 may be suitable for operating as master station 102 (FIG. 1) or a HEW STA 104 (FIG. 1). In accordance with embodiments, HEW device 1300 may include, among other things, a transmit/receive element 1301 (for example an antenna), a transceiver 1302, physical (PHY) circuitry 1304, and media access control (MAC) circuitry 1306. PHY circuitry 1304 and MAC circuitry 1306 may be HEW compliant layers and may also be compliant with one or more legacy IEEE 802.13 standards. MAC circuitry 1306 may be arranged to configure packets such as a physical layer convergence procedure (PLCP) protocol data unit (PPDUs) and arranged to transmit and receive PPDUs, among other things. HEW device 1300 may also include circuitry 1308 and memory 1310 configured to perform the various operations described herein. The circuitry 1308 may be coupled to the transceiver 1302, which may be coupled to the transmit/receive element 1301. While FIG. 13 depicts the circuitry 1308 and the transceiver 1302 as separate components, the circuitry 1308 and the transceiver 1302 may be integrated together in an electronic package or chip.

In some embodiments, the MAC circuitry 1306 may be arranged to contend for a wireless medium during a contention period to receive control of the medium for the HEW control period and configure an HEW PPDU. In some embodiments, the MAC circuitry 1306 may be arranged to contend for the wireless medium based on channel contention settings, a transmitting power level, and a CCA level.

The PHY circuitry 1304 may be arranged to transmit the HEW PPDU. The PHY circuitry 1304 may include circuitry for modulation/demodulation, upconversion/downconversion, filtering, amplification, etc. In some embodiments, the circuitry 1308 may include one or more processors. The circuitry 1308 may be configured to perform functions based on instructions being stored in a RAM or ROM, or based on special purpose circuitry. The circuitry 1308 may include processing circuitry and/or transceiver circuitry in accordance with some embodiments. The circuitry 1308 may include a processor such as a general purpose processor or special purpose processor. The circuitry 1308 may implement one or more functions associated with transmit/receive elements 1301, the transceiver 1302, the PHY circuitry 1304, the MAC circuitry 1306, and/or the memory 1310.

In some embodiments, the circuitry 1308 may be configured to perform one or more of the functions and/or methods described herein and/or in conjunction with FIGS. 1-13.

In some embodiments, the transmit/receive elements 1301 may be two or more antennas that may be coupled to the PHY circuitry 1304 and arranged for sending and receiving signals including transmission of the HEW packets. The transceiver 1302 may transmit and receive data such as HEW PPDU and packets that include an indication that the HEW device 1300 should adapt the channel contention settings according to settings included in the packet. The memory 1310 may store information for configuring the other circuitry to perform operations for configuring and transmitting HEW packets and performing the various operations to perform one or more of the functions and/or methods described herein and/or in conjunction with FIGS. 1-13.

In some embodiments, the HEW device 1300 may be configured to communicate using OFDM communication signals over a multicarrier communication channel. In some embodiments, HEW device 1300 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 1300 may use 4× symbol duration of 802.11n or 802.11ac.

In some embodiments, an HEW device 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The following examples pertain to further embodiments. Example 1 is an apparatus of a high-efficiency wireless local-area network (HEW) master station. The apparatus comprising transceiver circuitry and processing circuitry configured to generate a packet to indicate a multi-user request-to-send (MU-RTS) for one or more HEW stations, where the packet indicates one or more HEW station information fields for the one or more HEW stations, and where the one or more HEW station information fields comprise an address of a corresponding HEW station of the one or more HEW stations and an indication of a bandwidth for the corresponding HEW station of the one or more HEW stations to transmit one or more clear-to-send (CTS) packets, and transmit the packet to the one or more HEW stations.

In Example 2, the subject matter of Example 1 can optionally include where the packet is a trigger frame with a field that indicates that the packet is the MU-RTS.

In Example 3, the subject matter of Example 1 or Example 2 can optionally include where the packet is at least one of the following: a control frame with a new sub-type, a control frame with a control frame extension subtype, and a control frame with type 11 extension and subtype.

In Example 4, the subject matter of any of Examples 1-3 can optionally include where the packet includes an indication of a number of the one or more HEW stations.

In Example 5, the subject matter of any of Examples 1-4 can optionally include where the packet comprises an indication of an operating bandwidth for the MU-RTS by one from the following group: a scrambling seed and a signal A field (SIG-A).

In Example 6, the subject matter of any of Examples 1-5 can optionally include where the scrambling seed is to indicate the operating bandwidth if the communication protocol is Institute of Electrical and Electronic Engineers (IEEE) 802.11a and the signal A field is used if the communication protocol is one from the following group: high throughput, very-high throughput, and high-efficiency.

In Example 7, the subject matter of any of Examples 1-6 can optionally include where the bandwidth is indicated by one from the following group: a first start 20 MHz sub-channel and a number of 20 MHz sub-channels; and, a number of sub-channels with a second start 20 MHz sub-channel determined by a number of previous sub-channels allocated to other HEW stations.

In Example 8, the subject matter of any of Examples 1-7 can optionally include where the one or more HEW stations are to transmit a clear-to-send on each 20 MHz sub-channel.

In Example 9, the subject matter of any of Examples 1-8 can optionally include where the packet comprises an indication of one or more from the following group: a physical format for the HEW station to use for the CTS, a basic service set identification of the master station, a media access control format for the CTS, a network allocation vector checking rule, and a clear channel assessment parameter.

In Example 10, the subject matter of any of Examples 1-9 can optionally include where the packet comprises an indication for one or more from the following group: whether the HEW station should transmit a CTS, whether power control is used, the size of the one or more HEW station information fields, a bit to indicate if other HEW stations that receive the packet are permitted to perform spatial reuse, a format of one or more HEW station information fields, spatial reuse operation, whether CTS should be transmitted based on a low signal to noise ratio (SNR), and whether CTS should be transmitted based on a signal to interference plus noise ratio (SINR).

In Example 11, the subject matter of any of Examples 1-10 can optionally include where the transceiver circuitry and processing circuitry is further configured to transmit the packet in accordance with at least one from the following group: a sub-channel that is an integer multiple of 20 MHz and a duplicate of the CTS packet on each of one or more 20 MHz sub-channels.

In Example 12, the subject matter of any of Examples 1-11 can optionally include memory coupled to the transceiver circuitry and processing circuitry.

Example 13 is a non-transitory computer-readable storage medium that stores instructions for execution by one or more processors, the instructions to configure the one or more processors to cause a high-efficiency wireless local-area network (HEW) master station to: generate a packet to indicate a multi-user request-to-send (MU-RTS) for one or more HEW stations, where the packet indicates one or more HEW station information fields for the one or more HEW stations, and where the one or more HEW station information fields comprise an address of a corresponding HEW station of the one or more HEW stations and an indication of a bandwidth for the corresponding HEW station of the one or more HEW stations to transmit one or more clear-to-send (CTS) packets, and transmit the packet to the one or more HEW stations.

In Example 14, the subject matter of Example 13 can optionally include where the packet is at least one of the following: a control frame with a new sub-type, a control frame with an extension subtype, and a control frame with type 11 extension and subtype.

In Example 15, the subject matter of Examples 13 or 14 can optionally include where the packet is a trigger frame with a field that indicates that the packet is the MU-RTS.

In Example 16, the subject matter of any of Examples 13-15 can optionally include where the packet is at least one of the following: a control frame with a new sub-type, a control frame with a control frame extension subtype, and a control frame with type 11 extension and subtype.

In Example 17, the subject matter of any of Examples 13-16 can optionally include where the packet includes an indication of a number of the one or more HEW stations.

Example 18 is an apparatus of a high-efficiency wireless local-area network (HEW) device. The apparatus comprising circuitry configured to: receive a multi-user request-to-send (MU-RTS), copy a scramble seed from the MU-RTS to a clear-to-send (CTS) packet, and transmit the CTS packet.

In Example 19, the subject matter of Example 18 can optionally include where a format of the CTS packet is at least one of the following: a CTS format in accordance with Institute of Electrical and Electronic Engineers (IEEE) 802.11, a directional multi-gigabit (DMG) CTS format in accordance with IEEE 802.11, and new frame format indicated in MU-RTS.

In Example 20, the subject matter of Example 18 or Example 19 can optionally include where the circuitry is further configured to transmit the CTS packet at a rate selected from the following group: a same rate as the MU-RTS is to be received and a rate based on a rate selection rule, wherein the HEW device transmits the CTS packet at a same rate as other HEW devices that received the MU-RTS.

In Example 21, the subject matter of Example 20 can optionally include where the rate selection rule is the rate selection rule disclosed in Institute of Electrical and Electronic Engineers (IEEE) 802.11ax.

In Example 22, the subject matter of any of Examples 18-21 can optionally include where the circuitry is further configured to transmit the CTS packet in accordance with one from the following group: a sub-channel that is an integer multiple of 20 MHz and a duplicate of the CTS packet on each of one or more 20 MHz sub-channels.

In Example 23, the subject matter of any of Examples 18-21 can optionally include memory coupled to the circuitry.

Example 24 is a method performed by a high-efficiency wireless local-area network (HEW) device. The method including generating a packet to indicate a multi-user request-to-send (MU-RTS) for one or more HEW stations, wherein the packet indicates one or more HEW station information fields for the one or more HEW stations, and where the one or more HEW station information fields comprise an address of a corresponding HEW station of the one or more HEW stations and an indication of a bandwidth for the corresponding HEW station of the one or more HEW stations to transmit one or more clear-to-send (CTS) packets. The method includes transmitting the packet to the one or more HEW stations.

In Example 25, the subject matter of Example 24 can optionally include where transmitting further includes transmitting the CTS if the version of the trigger frame indicates a multi-user RTS (MU-RTS) and the SU-RTS indicates a specialized SU-RTS.

Example 26 is an apparatus of a high-efficiency wireless local-area network (HEW) master station. The apparatus including means for generating a packet to indicate a multi-user request-to-send (MU-RTS) for one or more HEW stations, where the packet indicates one or more HEW station information fields for the one or more HEW stations, and wherein the one or more HEW station information fields comprise an address of a corresponding HEW station of the one or more HEW stations and an indication of a bandwidth for the corresponding HEW station of the one or more HEW stations to transmit one or more clear-to-send (CTS) packets. The apparatus including means for transmitting the packet to the one or more HEW stations.

In Example 27, the subject matter of Example 26 can optionally include where the packet is a trigger frame with a field that indicates that the packet is the MU-RTS.

In Example 28, the subject matter of Example 26 or Example 27 can optionally include where the packet is at least one of the following: a control frame with a new sub-type, a control frame with a control frame extension subtype, and a control frame with type 11 extension and subtype.

In Example 29, the subject matter of any of Examples 26-28 can optionally include where the packet includes an indication of a number of the one or more HEW stations.

In Example 30, the subject matter of any of Examples 26-28 can optionally include where the packet comprises an indication of an operating bandwidth for the MU-RTS by one from the following group: a scrambling seed and a signal A field (SIG-A).

In Example 31, the subject matter of Example 30 can optionally include where the scrambling seed is to indicate the operating bandwidth if the communication protocol is Institute of Electrical and Electronic Engineers (IEEE) 802.11a and the signal A field is used if the communication protocol is one from the following group: high throughput, very-high throughput, and high-efficiency.

In Example 32, the subject matter of any of Examples 26-31 can optionally include where the bandwidth is indicated by one from the following group: a first start 20 MHz sub-channel and a number of 20 MHz sub-channels; and, a number of sub-channels with a second start 20 MHz sub-channel determined by a number of previous sub-channels allocated to other HEW stations.

In Example 33, the subject matter of any of Examples 26-32 can optionally include where the one or more HEW stations are to transmit a clear-to-send on each 20 MHz sub-channel.

In Example 34, the subject matter of any of Examples 26-33 can optionally include where the packet comprises an indication of one or more from the following group: a physical format for the HEW station to use for the CTS, a basic service set identification of the master station, a media access control format for the CTS, a network allocation vector checking rule, and a clear channel assessment parameter.

In Example 35, the subject matter of any of Examples 26-34 can optionally include where the packet comprises an indication for one or more from the following group: whether the HEW station should transmit a CTS, whether power control is used, the size of the one or more HEW station information fields, a bit to indicate if other HEW stations that receive the packet are permitted to perform spatial reuse, a format of one or more HEW station information fields, spatial reuse operation, whether CTS should be transmitted based on a low signal to noise ratio (SNR), and whether CTS should be transmitted based on a signal to interference plus noise ratio (SINR).

In Example 36, the subject matter of any of Examples 26-35 can optionally include means for transmitting the packet in accordance with at least one from the following group: a sub-channel that is an integer multiple of 20 MHz and a duplicate of the CTS packet on each of one or more 20 MHz sub-channels.

In Example 37, the subject matter of any of Examples 26-36 can optionally include means for storing and retrieving packets.

Example 38 is an apparatus of a high-efficiency wireless local-area network (HEW) device. The apparatus including means for receiving a multi-user request-to-send (MU-RTS), means for copying a scramble seed from the MU-RTS to a clear-to-send (CTS) packet, and means for transmitting the CTS packet.

In Example 39, the subject matter of Example 39 can optionally include where a format of the CTS packet is at least one of the following: a CTS format in accordance with Institute of Electrical and Electronic Engineers (IEEE) 802.11, a directional multi-gigabit (DMG) CTS format in accordance with IEEE 802.11, and new frame format indicated in MU-RTS.

In Example 40, the subject matter of Examples 38 or 39 can optionally include means for transmitting the CTS packet at a rate selected from the following group: a same rate as the MU-RTS is to be received and a rate based on a rate selection rule, wherein the HEW device transmits the CTS packet at a same rate as other HEW devices that received the MU-RTS.

In Example 41, the subject matter of Example 40 can optionally include where the rate selection rule is the rate selection rule disclosed in Institute of Electrical and Electronic Engineers (IEEE) 802.11ax.

In Example 42, the subject matter of any of Examples 38-41 can optionally include means for transmitting the CTS packet in accordance with one from the following group: a sub-channel that is an integer multiple of 20 MHz and a duplicate of the CTS packet on each of one or more 20 MHz sub-channels.

In Example 43, the subject matter of any of Examples 38-42 can optionally include means for storing and retrieving packets.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) access point (AP), the apparatus comprising: memory; and processing circuitry coupled to the memory, the processing circuitry configured to:
   encode a HE physical layer convergence procedure (PLCP) protocol data unit (PPDU), the HE PPDU comprising a multi-user (MU) request-to-send (RTS)

trigger frame, the MU-RTS trigger frame comprising a type field, wherein a value of the type field indicates the MU-RTS trigger frame is a trigger frame of type MU-RTS, wherein the MU-RTS trigger frame further comprises a plurality of HE station information fields, wherein each of the plurality of HE station information fields comprises an association identification (AID) field and an indication of a bandwidth of a clear-to-send (CTS) frame, wherein the MU-RTS trigger frame indicates that a HE station identified by the AID field is to transmit the CTS frame with the bandwidth, and wherein the MU-RTS trigger frame further comprises a carrier sense (CS) field to indicate whether HE stations addressed by the AID field are required to sense the medium and determine whether to respond to the MU-RTS trigger frame based on a state of the medium and a state of a network availability vector (NAV); and generate signaling to cause the HE AP to wirelessly transmit the HE PPDU.

2. The apparatus of claim 1, wherein the MU-RTS trigger frame further comprises a receiver address field, wherein a value of the receiver address field is set to a broadcast address.

3. The apparatus of claim 1, wherein the MU-RTS trigger frame further comprises a duration field, wherein a value of the duration field is set to a duration to extend to an end of a transmission opportunity (TXOP), the TXOP comprising the HE PPDU.

4. The apparatus of claim 1, wherein the processing circuitry is further configured to:

generate signaling to cause the HE AP to wirelessly transmit the HE PPDU with a second bandwidth, wherein the second bandwidth is different than the bandwidth of the CTS frame.

5. The apparatus of claim 1, wherein the bandwidth field indicates one or more 20 MHz channels, and wherein the addressed HE station is to transmit a duplicative of the CTS frame within each of the one or more 20 MHz channels.

6. The apparatus of claim 5, wherein the CTS frame is a legacy CTS frame with a bandwidth of 20 MHz.

7. The apparatus of claim 1, wherein the HE PPDU comprises a media access control (MAC) portion, and wherein the MAC portion comprises the MU-RTS trigger frame.

8. The apparatus of claim 1, wherein the MU-RTS trigger frame further comprises a spatial reuse field, the spatial reuse field indicates if stations not addressed by the plurality of HE station information fields are permitted to perform spatial reuse.

9. The apparatus of claim 1, wherein the HE stations addressed by the AID field are to sense the medium by performing a clear channel assessment.

10. The apparatus of claim 1, wherein the processing circuitry is further configured to:

encode a second trigger frame, the second trigger frame comprising downlink data for one or more HE stations of HE stations addressed in the plurality of HE station information fields; and generate a signal to cause the HE AP to wirelessly transmit the second trigger frame to the one or more HE stations.

11. The apparatus of claim 1, wherein the MU-RTS trigger frame further comprises a length field, wherein a value of the length field indicates a number of the plurality of HE station information fields.

12. The apparatus of claim 1, wherein the HE AP and the addressed HE station is one from the following group: an Institute of Electrical and Electronic Engineers (IEEE) 802.11ax access point, an IEEE 802.11ax station, an IEEE 802.11 station, and an IEEE 802.11 access point.

13. The apparatus of claim 1, further comprising: transceiver circuitry coupled to the processing circuitry; and one or more antennas coupled to the transceiver circuitry.

14. A non-transitory computer-readable storage medium that stores instructions for execution by one or more processors of an apparatus of a high-efficiency (HE) access point (AP), the instructions to configure the one or more processors to:

encode a HE physical layer convergence procedure (PLCP) protocol data unit (PPDU), the HE PPDU comprising a multi-user (MU) request-to-send (RTS) trigger frame, the MU-RTS trigger frame comprising a type field, wherein a value of the type field indicates the MU-RTS trigger frame is a trigger frame of type MU-RTS, wherein the MU-RTS trigger frame further comprises a plurality of HE station information fields, wherein each of the plurality of HE station information fields comprises an association identification (AID) field and an indication of a bandwidth of a clear-to-send (CTS) frame, wherein the MU-RTS trigger frame indicates that a HE station identified by the AID field is to transmit the CTS frame with the bandwidth, and wherein the MU-RTS trigger frame further comprises a carrier sense (CS) field to indicate whether HE stations addressed by the AID field are required to sense the medium and determine whether to respond to the MU-RTS trigger frame based on a state of the medium and a state of a network availability vector (NAV); and generate signaling to cause the HE AP to wirelessly transmit the HE PPDU.

15. The non-transitory computer-readable storage medium of claim 14, wherein the bandwidth field indicates one or more 20 MHz channels, and wherein the addressed HE station is to transmit a duplicative of the CTS frame within each of the one or more 20 MHz channels.

16. The non-transitory computer-readable storage medium of claim 14, wherein the MU-RTS trigger frame further comprises a receiver address field, and wherein a value of the receiver address field is set to a broadcast address.

17. The non-transitory computer-readable storage medium of claim 14, wherein the MU-RTS trigger frame further comprises a duration field, and wherein a value of the duration field is set to a duration to extend to an end of a transmission opportunity (TXOP), the TXOP comprising the HE MU PPDU.

18. A method performed by an apparatus of a high-efficiency (HE) access point (AP), the method comprising:

encoding a HE physical layer convergence procedure (PLCP) protocol data unit (PPDU), the HE PPDU comprising a multi-user (MU) request-to-send (RTS) trigger frame, the MU-RTS trigger frame comprising a type field, wherein a value of the type field indicates the MU-RTS trigger frame is a trigger frame of type MU-RTS, wherein the MU-RTS trigger frame further comprises a plurality of HE station information fields, wherein each of the plurality of HE station information fields comprises an association identification (AID) field and an indication of a bandwidth of a clear-to-send (CTS) frame, wherein the MU-RTS trigger frame indicates that a HE station identified by the AID field is to transmit the CTS frame with the bandwidth, and wherein the MU-RTS trigger frame further comprises a carrier sense (CS) field to indicate whether HE stations addressed by the AID field are required to sense the medium and determine whether to respond to the MU-RTS trigger frame based on a state of the medium and a state of a network availability vector (NAV); and generating signaling to cause the HE AP to wirelessly transmit the HE PPDU.

19. The method of claim 18, wherein the trigger frame further comprises a carrier sense (CS) field to indicate whether HE stations addressed by the AID field are required to perform a clear channel assessment to determine whether to respond to the MU-RTS trigger frame.

20. An apparatus of a high-efficiency (HE) station, the apparatus comprising: memory; and processing circuitry coupled to the memory, the processing circuitry configured to:

decode a HE physical layer convergence procedure (PLCP) protocol data unit (PPDU), the HE PPDU comprising a media access control (MAC) portion, the MAC portion comprising a trigger frame, the trigger frame comprising a type field, wherein a value of the type field indicates the trigger frame is a multi-user (MU) request-to-send (RTS) trigger frame, the trigger frame further comprising a plurality of HE station information fields, wherein each of the plurality of HE station information fields comprises an association identification (AID) field and an indication of a bandwidth of a clear-to-send (CTS) frame, wherein the HE station is addressed by the AID field and is to transmit the CTS frame with the bandwidth; and generate signaling to cause the HE AP to transmit the HE PPDU.

21. The apparatus of claim 20, wherein the trigger frame further comprises a carrier sense (CS) field to indicate whether HE stations addressed by the AID field are required to sense the medium and determine whether to respond to the trigger frame based on a state of the medium and a state of a network availability vector (NAV).

22. The apparatus of claim 21, wherein processing circuitry is further configured to:

in response to the CS field indicating that the HE station is required to sense the medium and determine whether to respond to the trigger frame based on the state of the medium and the state of a network availability vector (NAV), perform a CCA on the bandwidth, wherein the CCA comprises determining if one or more network availability vectors (NAVs) indicate the bandwidth is busy and determining whether sensed signals from the bandwidth indicate the bandwidth is busy; and in response to a determination that the bandwidth is not busy, generate signaling to transmit the CTS frame on the bandwidth.

23. The apparatus of claim 22, wherein the CCA is performed for each 20 MHz channel of the bandwidth, and wherein the processing circuitry is further configured to:

in response to the determination that a 20 MHz channel of the bandwidth is not busy, generate signaling to transmit the CTS frame on the 20 MHz channel.

24. The apparatus of claim 20, wherein the trigger frame further comprises a receiver address field, and wherein a value of the receiver address field is set to a broadcast address.

25. The apparatus of claim 20, further comprising transceiver circuitry coupled to the processing circuitry; and one or more antennas coupled to the transceiver circuitry.

\* \* \* \* \*